Jan. 26, 1937.  C. S. HAZARD  2,069,184
COMPUTING APPARATUS
Filed May 24, 1935   5 Sheets-Sheet 1

Jan. 26, 1937. C. S. HAZARD 2,069,184
COMPUTING APPARATUS
Filed May 24, 1935 5 Sheets-Sheet 2

INVENTOR
Charles S. Hazard
BY
Redding, Greeley & O'Brien
ATTORNEYS

Jan. 26, 1937.   C. S. HAZARD   2,069,184
COMPUTING APPARATUS
Filed May 24, 1935   5 Sheets-Sheet 3

INVENTOR
Charles S. Hazard
BY
Redding, Greeley & O'Shea
ATTORNEYS

Jan. 26, 1937.　　　　C. S. HAZARD　　　　2,069,184
COMPUTING APPARATUS
Filed May 24, 1935　　　　5 Sheets-Sheet 4

INVENTOR
Charles S. Hazard
BY
Redding, Greeley & O'Shea
ATTORNEYS

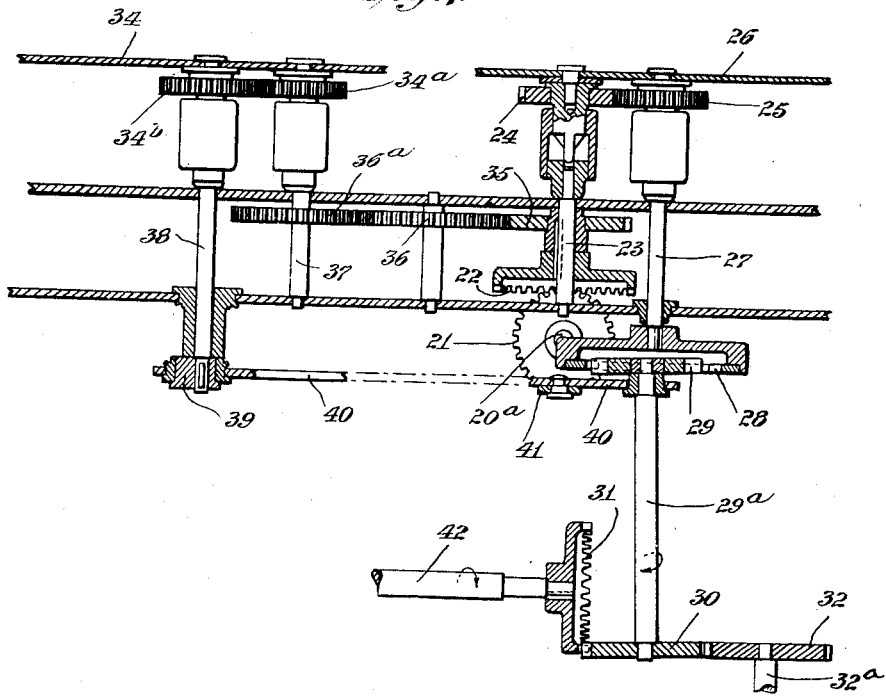

Patented Jan. 26, 1937

2,069,184

UNITED STATES PATENT OFFICE 2,069,184

COMPUTING APPARATUS

Charles S. Hazard, New York, N. Y., assignor to Neptune Meter Company, New York, N. Y., a corporation of New Jersey Application May 24, 1935, Serial No. 23,148

3 Claims. (Cl. 74—393)

The apparatus in which the present invention is exemplified has been designed with particular reference to the dispensing of gasoline in which there is exhibited to the customer not only the number of gallons delivered, but the price per gallon and the cost to the customer of the quantity delivered. The invention is particularly concerned with the mechanism whereby the resultant of different price elements, such as cents and fractions of cents, for example, are combined in the computation of the price of a sale. The construction is such as to permit ready adjustment of the apparatus in accordance with variations in unit prices and provision is made whereby totals are registered as usual for the benefit of the seller.

The invention will be fully described hereinafter with reference to the accompanying drawings in which an exemplification of the invention is illustrated, and in which:

Figure 7 is a development of the gears shown in Figure 6.

Figure 1:
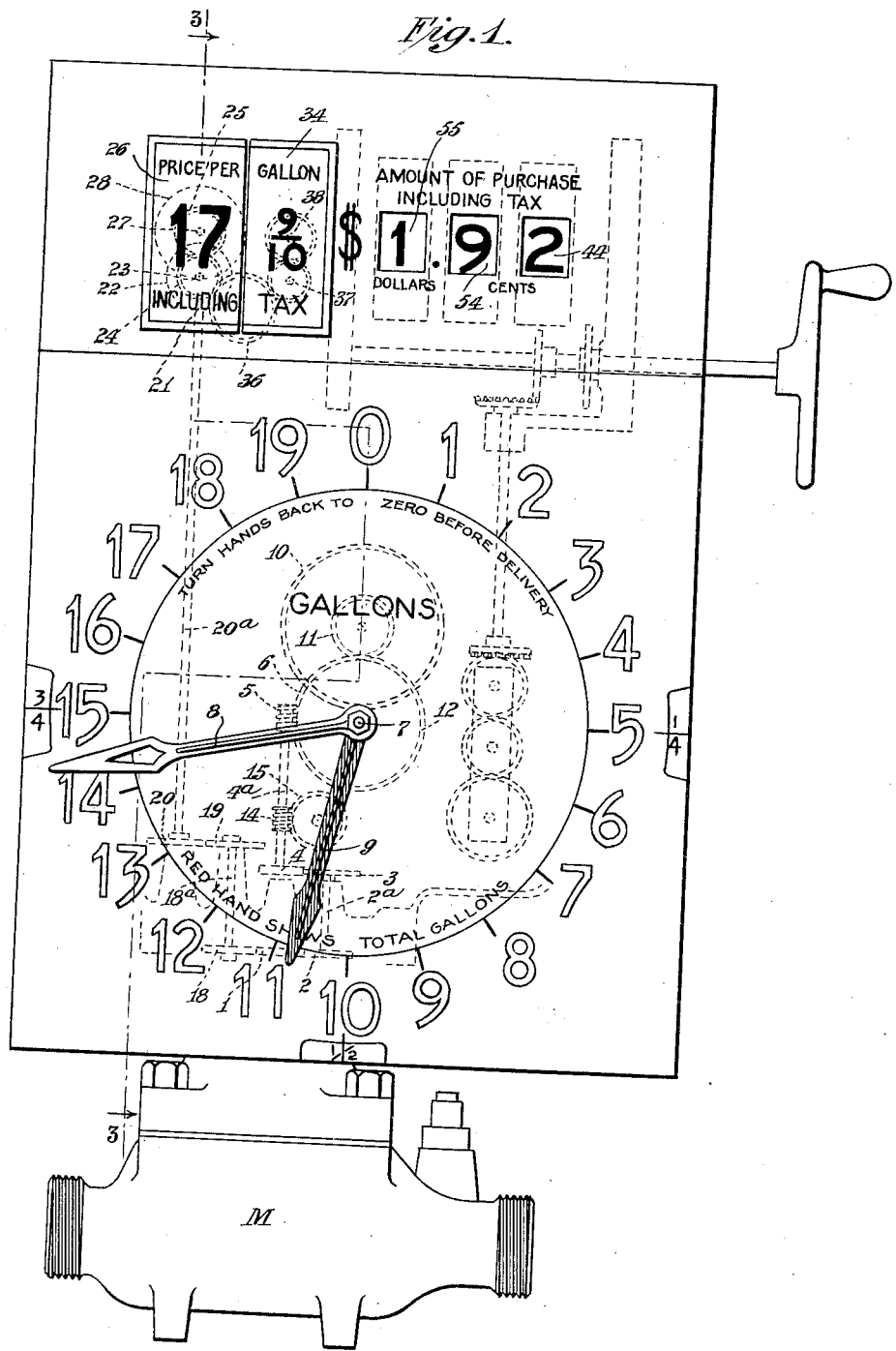
Figure 1 is a view in front elevation of an apparatus in which the invention is incorporated, a meter of known type being also shown.
Figure 2:
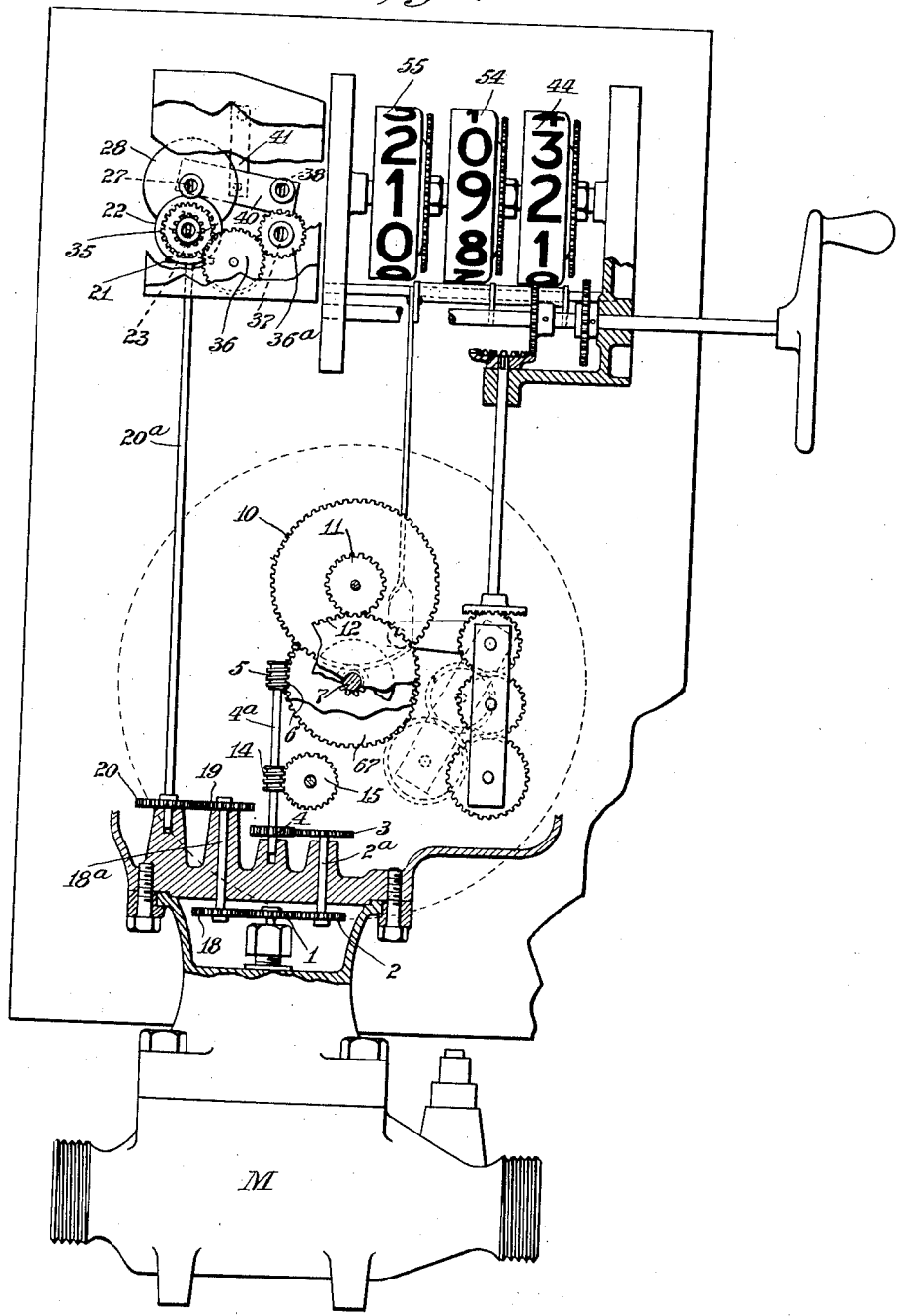
Figure 2 is a view of the same, partly in vertical section and partly in elevation, with the dial plate removed.
Figure 3:
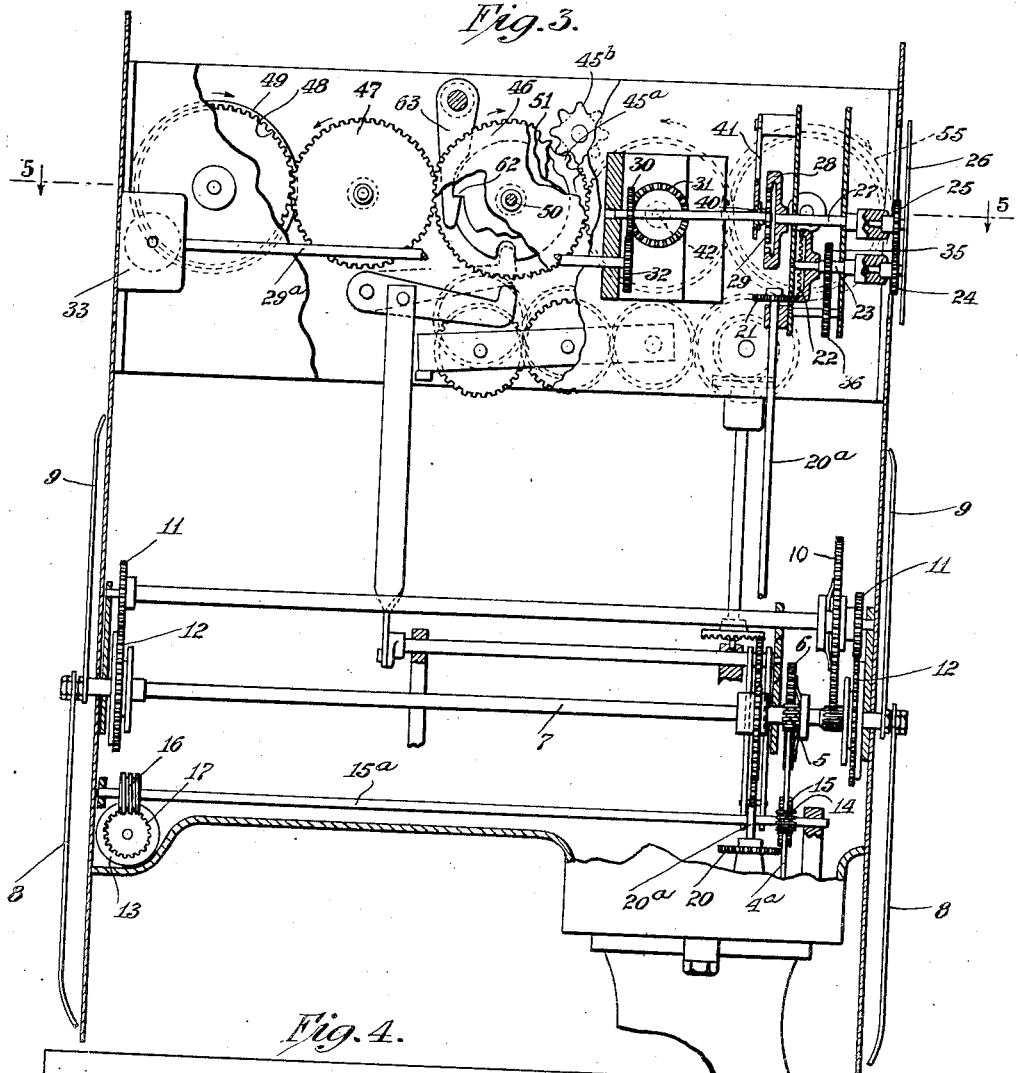
Figure 3 is a view in sectional elevation on the plane indicated by the broken line 3—3 of Figure 1.
Figure 4:
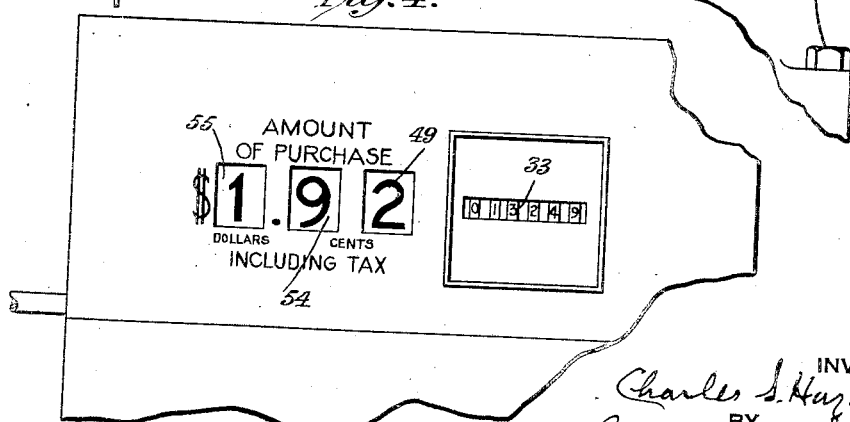
Figure 4 is a fragmentary view of the apparatus as seen from the opposite side, showing a sale indicator and a totalizer for the convenience of the seller.

In the embodiment of the invention illustrated a meter, of the type often used in connection with gasoline dispensing apparatus, is shown at M. The gasoline indicating device and the sale price indicating device are actuated from the meter through independent trains of gearing. As shown in Figures 1 and 2, a gear 1 on the meter spindle meshes on one side with a gear 2, which, through a shaft 2$^a$, gears 3, 4, worm 5 on shaft 4$^a$, and worm gear 6, frictionally mounted on shaft 7, actuates the unit indicating hands 8, which sweep over the dials at the front and the rear sides of the apparatus. The secondary indicating hands 9, mounted loosely on the shaft 7, are driven therefrom through gears 10, 11, and 12 as usual and as shown in Figures 1, 2, and 3. The gallonage totalizer, which is sufficiently indicated at 13 in Figure 3, is driven through a worm 14 on the shaft 4$^a$, a worm gear 15, and a worm 16 on the shaft 15$^a$, and a worm gear 17 on the shaft of the totalizer.

The gear 1 also meshes with a gear 18, which, through its shaft 18$^a$, gears 19, 20, shaft 20$^a$ and gears 21 and 22, drives shaft 23. In the embodiment of the invention shown, one of the change gears 24, 25, both of which are carried by a removable price tag 26 (which in this case shows cents), engages a socket on the shaft 23. The other change gear 25 similarly engages a socket on a shaft 27. It will be understood that each price tag 26 carries a different pair of gears to correspond to the integral portion of each price per gallon within the working range. The shaft 27 carries a gear 28, shown in Figure 3 and in detail in Figure 10, formed with internally cut teeth which engage the teeth of a gear 29 on a shaft 29$^a$, which carries a gear 30 (see Figures 3 and 5). The latter meshes with a gear 32 which, through a shaft 32$^a$, drives a continuous totalizer for dollars and cents which may be of usual construction and is sufficiently represented at 33 in Figures 3 and 5. The ratio of the gears 24 and 25 determines the ratio between the revolution of the meter and the revolution of the cash totalizer 33. It will be understood that the term "change gear" is employed for convenience and is not to be regarded as excluding any other arrangement which functions in like manner.

Other price tags 34, each bearing an indication of a fractional part of a cent, are provided for the purpose of effecting proper actuation of the totalizer. For this purpose a gear 35 (see Figure 2) on the shaft 23, through suitable reduction gearing 36, 36$^a$, drives shaft 37 engaged through a socket at its end by a change gear 34$^a$ on the price tag 34. The other change gear 34$^b$ meshes with and drives shaft 38 on which is mounted an eccentric 39. The eccentric engages and oscillates a lever 40 in such manner as to cause the pinion 29, carried by the lever, to move in a circle, the lever 40 being engaged at its center by a short link 41 pivoted at a fixed point, so that the free end of the lever and the pinion carried thereby shall have an approximately circular motion. The teeth of the pinion 29 being always in engagement with the teeth of the internal gear 28 each oscillation of the lever 40 causes the gears 29 and 30, both carried by the shaft 29$^a$, to gain or lose a certain number of teeth with respect to the rotation of shaft 27 from which the internal gear 28 receives motion. It will be understood that gain or loss is determined by the relative direction of rotation of the shafts 23 and 37. As the rotation thus imparted to gears 29 and 30, by reason of the oscillation of lever 40, is independent of rotation of the shaft 27, the effect is to add to or subtract from the rotation of shaft 27 an increment or decrement determined by the ratio of the change gears 34a and 34b, the relative direction of rotation of the shafts 23 and 37 determining, as above pointed out, whether the effect is an increment or a decrement.

Figure 5:
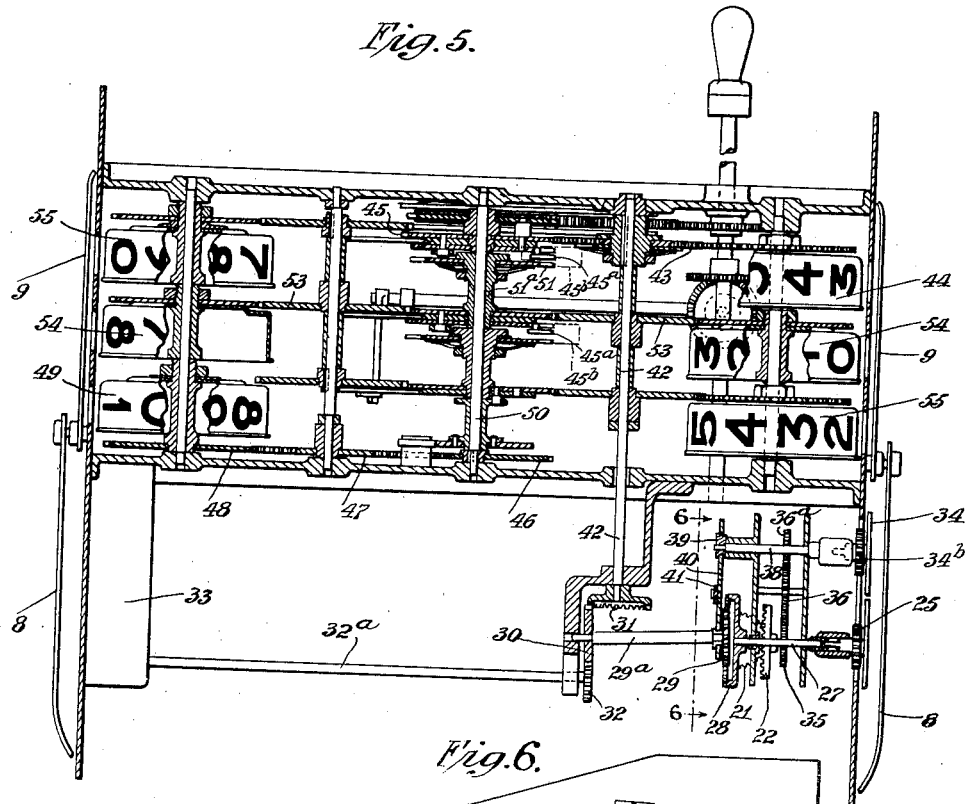
Figure 5 is a view in horizontal section on the plane indicated by the broken line 5—5 of Figure 3.
Figure 6:
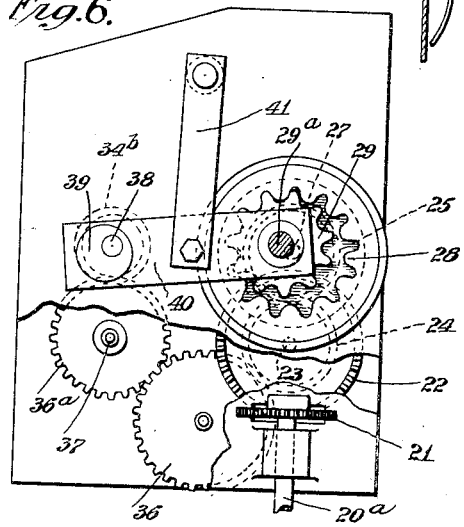
Figure 6 is an enlarged detail view in section on the line 6—6 of Figure 5.

For the operation of the sale amount indicating device a gear 31, which is engaged and driven by the gear 30, is fixed to a shaft 42, shown in Figures 3, 5 and 7, upon which is mounted frictionally a gear 43. The latter, as shown in Figure 6, engages and drives a gear 45 which is fixed on the shaft 50 to which is also fixed a gear 46, which, through gears 47 and 48, drives the rear units numeral wheel 49. Gear 45 has secured to it the teeth 45a of a Geneva movement, which, in the rotation of the gear 45, engage and actuate a mutilated pinion 45b. The latter engages and actuates a gear 51, which is frictionally mounted on a hub 51a on the shaft 50. Gear 52, fixed to the hub 51a, drives the tens numeral wheel 54, both at the front of the apparatus and at the back thereof, through idler gears 53. The hundreds numeral wheel 55 is similarly driven through a Geneva movement actuated by the gear 52.

It will be understood that various changes in details of construction and arrangement can be made to suit different conditions of use and the invention, therefore, is not restricted to the particular construction shown and described, except as set forth in the accompanying claims.

I claim as my invention:

1. In combination, two change gears corresponding to different values, a common means to actuate both of said change gears, means to transmit movement from one of said change gears, said transmitting means including a gear rotated with said last mentioned change gear and a wobble shaft having a gear in engagement with the gear rotated with the last mentioned change gear, and means actuated by the other change gear to cause the gear on the wobble shaft to have bodily movement in a circular path while in engagement with the gear included in said transmitting means, whereby the movement of rotation of the wobble shaft is a resultant of the rotation of both change gears.

2. In combination, two change gears corresponding to different values, a common means to actuate both of said change gears, means to transmit movement from one of said change gears, said transmitting means including a gear rotated with said last mentioned change gear, and a wobble shaft having a gear in engagement with the gear rotated with the last mentioned change gear, a lever pivoted on a fixed point and supporting one end of the wobble shaft, and means actuated by the other change gear to cause the gear on the wobble shaft to have bodily movement in a circular path while in engagement with the gear included in said transmitting means, whereby the movement of rotation of the wobble shaft is the resultant of the rotation of both change gears.

3. In combination, two change gears corresponding to different values, a common means to actuate both of said change gears, means to transmit movement from one of said change gears including an internal gear rotated with said change gear and a wobble shaft having a gear in engagement with the internal gear, and means actuated by the other change gear to cause the gear on the wobble shaft to have bodily movement in a circular path while in engagement with the internal gear, whereby the movement of rotation of the wobble shaft is a resultant of the rotation of both change gears.

CHARLES S. HAZARD.